US009911217B2

(12) United States Patent
Iurascu

(10) Patent No.: US 9,911,217 B2
(45) Date of Patent: Mar. 6, 2018

(54) ANIMATION ARRANGEMENT

(71) Applicant: Danut-Petru Iurascu, Iasi (RO)

(72) Inventor: Danut-Petru Iurascu, Iasi (RO)

(73) Assignee: Continental Automotive GmbH, Hannover (DE)

(*) Notice: Subject to any disclaimer, the term of this patent is extended or adjusted under 35 U.S.C. 154(b) by 216 days.

(21) Appl. No.: 14/850,314

(22) Filed: Sep. 10, 2015

(65) Prior Publication Data
US 2016/0078661 A1    Mar. 17, 2016

(30) Foreign Application Priority Data
Sep. 11, 2014    (EP) .................................... 14465523

(51) Int. Cl.
G06T 13/00    (2011.01)
B60K 37/06    (2006.01)
G06T 1/20    (2006.01)

(52) U.S. Cl.
CPC .............. G06T 13/00 (2013.01); B60K 37/06 (2013.01); G06T 1/20 (2013.01)

(58) Field of Classification Search
CPC ...................................................... G06T 13/00
See application file for complete search history.

(56) References Cited

U.S. PATENT DOCUMENTS

| | | | | |
|---|---|---|---|---|
| 2006/0100021 A1* | 5/2006 | Yoshino | .................. | A63F 13/00 463/45 |
| 2008/0059074 A1* | 3/2008 | Wei | .......................... | G01V 1/34 702/16 |
| 2011/0026008 A1* | 2/2011 | Gammenthaler | ..... | G01S 17/023 356/28 |
| 2011/0176007 A1* | 7/2011 | Ding | .................... | H04N 9/3182 348/189 |
| 2011/0221901 A1 | 9/2011 | Bai et al. | | |
| 2014/0104682 A1 | 4/2014 | Nagahara | | |
| 2014/0297516 A1* | 10/2014 | Brown | ................ | G06F 3/04817 705/39 |

FOREIGN PATENT DOCUMENTS

JP        2002278658 A  *  9/2002  ............... G06F 1/32

OTHER PUBLICATIONS

Translation of JP2002278658A, Yoshimoto Shinichi, Information processor e.g. personal computer, displays present operating state information of CPU in either of display units, based on determined display quality, Sep. 27, 2002.*
"Qt Creator" Creating a Project, (2014Q1752), Retrieved on Mar. 18, 2014, 5 pages.
"Creating Projects", (2014Q01753), Retrieved on Mar. 18, 2014, 7 pages.

* cited by examiner

*Primary Examiner* — Kee M Tung
*Assistant Examiner* — Grace Q Li
(74) *Attorney, Agent, or Firm* — Cozen O'Connor

(57) ABSTRACT

An animation arrangement for a vehicle is provided. The animation arrangement has a display device, configured to display an animation based on an instruction set, a storage device configured to store a first instruction set and a second instruction set for displaying the same animation on the display device, and a calculating device configured to select one of the first and second instruction sets for displaying an animation on the display device. The calculating device is configured to select one of the first and second instruction sets for displaying an animation on the display device based on a load parameter of the calculating device.

11 Claims, 2 Drawing Sheets

ANIMATION ARRANGEMENT

BACKGROUND OF THE INVENTION

1. Field of the Invention

The invention relates to animation arrangements, in particular to animation arrangements used in vehicles. Further, the invention relates to a method for operating an animation arrangement and to a computer program product.

2. Description of the Related Art

Displays are increasingly used in vehicles or in the automotive sector for displaying information to a driver. Often, animations are presented that require a considerable amount of resources when being presented by an animation arrangement.

An animation may be presented on a display and may be based on virtual data or on instructions of a processing unit. Many kinds of animations are possible, for example for driver assistance systems or for presenting vehicle status data or information.

Depending on the animation and the animated elements as well as on the instructions used to initiate the animation device to present the animation, the processing unit requires more or fewer resources (calculation time, memory usage, for example) or the performance of the presented animation may be influenced (the number of the presented frames per second may vary, for example).

SUMMARY OF THE INVENTION

An object to the invention to provide an animation arrangement that requires fewer computing resources for presenting an animation content.

According to one aspect, an animation arrangement for a vehicle is provided. The animation arrangement comprises a display device, a storage device, and a calculating device. The display device is configured to display an animation based on an instruction set. The storage device is configured to store a first instruction set and a second instruction set for displaying the same animation on the display device. The calculating device is configured to select one of the first and second instruction sets for displaying an animation on the display device, wherein the calculating device is further configured to select one of the first and second instruction sets for displaying an animation on the display device based on a load parameter of the calculating device.

The first and second instruction sets may be implemented differently, i.e. contain different techniques or commands, although these sets are adapted to present the same animation or animation content on the display unit.

Depending on operation condition or operation parameters like overall load of the processing unit or memory usage (used resources of the calculating unit or of the animation arrangement), the calculating unit may select the one of the first and second instruction set that requires fewer resources under the present operation condition. Such an animation device may in particular facilitate using components having less computational power and thus less power consumption and less heat emission but being able to present the same animation without performance losses.

Further, the animation arrangement may enable a more economic use of components as a runtime decision is based on the instruction set that is used. The components must not necessarily be construed for a worst case scenario, which takes into consideration any possible operation with a maximum computational resource requirement, as at the runtime a decision on the used instruction set is taken in view of the current load of the calculation unit.

Of course, the storage device may be configured to store more than two instruction sets.

The animation arrangement enables using the resources of the calculating device economically, whereas the required memory of the storage device may increase due to the fact that for the same animation more than one instruction set is available. However, this may be advantageous as the computational resource saving implementation of the instruction sets predominate the additionally required memory of the storing device.

An instruction set may be a given set of instructions for the calculating device for initiating the display device to present or display a predefined animation.

According to one embodiment, the calculating device is configured to select one of the first and second instruction sets during a runtime of the animation arrangement.

Thus, the calculating device may select the used instruction set under the current load conditions of the animation arrangement and may select another instruction set if the load conditions of the animation arrangements vary or change, for example if the animation is to be performed again after a period of time.

According to one embodiment, the calculating device is configured to select one of the first and second instruction sets based on at least one of the group of load parameters consisting of the following elements: memory usage of each instruction set, required calculation time of the calculating device for handling each instruction set, and overall load of the calculating device.

In particular, the memory usage of each instruction set corresponds to a memory usage in the calculating device for performing the required operations. The calculation time may be a crucial parameter if the calculating device carries out one or more parallel operations, for example an entertainment program or navigation.

According to one embodiment, the animation arrangement further comprises a control device, wherein the control device is configured to monitor the load parameters of the calculating device and to determine which of the available instruction sets to use by the calculating device.

The control device may in particular be coupled to the calculating device and to the storage device. In one embodiment, the control device may select one of the instruction sets and provide it to the calculating device for carrying out the animation process. The control device may further be configured to determine the performance of an instruction set under the present operation condition of the calculating device such that the appropriate instruction set is selected, i.e. the instruction set which leads to an animation performance which is optimal in view of a key performance indicator, for example the frames per second of the animation when being displayed on the display unit.

According to one embodiment, the first instruction set is a Qt modeling language (QML) instruction set configured to perform an animation on the display device when being carried out by the calculating device.

A QML implementation of an instruction set is easy to write and maintain. Depending on the complexity of an animation or an animated scene, the load of the calculating device (for example cpu load) and frame per seconds, fps, which is a Key Performance Indicator for an animation arrangement are affected disadvantageously, particularly, the fps decreases when using QML under heavy load of the calculating device.

According to one embodiment, the second instruction set is an open graphics library shading language (GLSL) instruction set configured to perform an animation on the display device when being carried out by the calculating device.

Compared to a QML implementation of an instruction set, a GLSL implementation may be better to use as it requires less computational resources. When an animation scene is deep (i.e. a graph scene is less flat, but height is considerable bigger—for example 10×50—scene contains 10 children per 1st level and 50 levels of depth) a calculating device load may decrease about a few percents. When the scene is flat (i.e. graph scene is less deep, but the length is considerable bigger—50×10—scene contains 50 children per 1st level and 10 levels of depth), GLSL implementation of an animation may run much better than the QML implementation, particularly the fps rate is higher and the calculating device load is lower, for example about 20%.

According to one embodiment, the calculating device comprises a central processing unit, CPU, and a graphics processing unit, GPU, wherein the calculating device is configured to carry out at least some instructions of the second instruction set by the graphics processing unit.

Using QML and GLSL may be advantageous if the calculating device comprises a central processing unit (CPU) and a graphics processing unit (GPU). The GLSL instruction set decreases the CPU load because some computational operations are transferred to the GPU.

Depending on the structure of the item to be animated, the parameter of CPU load and frame rates during animation can be improved using GLSL. Therefore, it may be advantageous to have a runtime decision on the format of the used instruction set, for example QML or GLSL, in order to have a better load balance between GPU and CPU.

If, for example, the CPU is 90% loaded, and the animation arrangement is in the phase to start an animation, it might be better to start it in GLSL format in order not to affect the fps.

If the GPU is 90% loaded, and the animation arrangement is in the phase to start an animation, it might be better to start it in QML format due to the same reason not to affect the fps.

If there is no significant load on the CPU and the GPU, and the animation arrangement is in the phase to start an animation, than GLSL format might be selected.

If the calculating device comprises a CPU and a GPU, according to one embodiment, the load of each of these components may be used as a parameter for selecting the first or second instruction set.

According to one embodiment, the animation arrangement further comprises a converting device configured to convert the first instruction set into the second instruction set.

Such a converting device may in particular be advantageous when using QML and GLSL as there is no easy way to write and maintain a GLSL implementation manually. The converting device therefore takes a QML instruction set and converts it into a GLSL instruction set.

The converting device is adapted to use the first instruction set as input data and to provide the second instruction set as output data. After the generation of the second instruction set, both, the first and second instruction sets are available for use by the calculating device.

According to one embodiment, the converting device is configured to convert the first instruction set into the second instruction set before the calculating device requests one of the first and second instruction sets. Thus, an access time to the second instruction set is reduced as the second instruction set has already been generated before being required by the calculating device.

According to a further aspect, a method for operating an animation arrangement is provided. The method comprises providing a first instruction set and a second instruction set for displaying a same animation on a display device, selecting one of the first and second instruction sets to be carried out by a calculating device based on a load parameter of the calculating device, and presenting the animation by a display device based on the selected instruction set.

It should be noted that the description with regard to the animation arrangement similarly applies to the method, where appropriate. Particularly, the method is adapted for being carried out by an animation arrangement as described above and hereinafter.

According to one embodiment, the method further comprises converting the first instruction set into the second instruction set.

Therefore, there is no necessity to provide both instruction sets by an operator or to code both instruction sets. Only one instruction set has to be coded or drafted by an operator whereas the second instruction set is generated by converting the first instruction set into the second instruction set such that a configuration time of the animation arrangement is reduced.

According to one embodiment, converting the first instruction set into the second instruction set is carried out before the step of providing the first instruction set and the second instruction set. In other words, the first instruction set may be converted to the second instruction set before one of the first or second instruction sets is requested for generating an animation on the display device.

According to a further aspect, a computer program product is provided configured to carry out the steps of the method as described above and hereinafter when being carried out on an animation arrangement as described above and hereinafter. The computer program product may be stored on a computer readable medium like a CD-ROM, DVD, or any other persistent or non-persistent storage medium.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, exemplary embodiments of the invention are described with reference to the following drawings.

DETAILED DESCRIPTION OF THE PRESENTLY PREFERRED EMBODIMENTS

Figure 1:
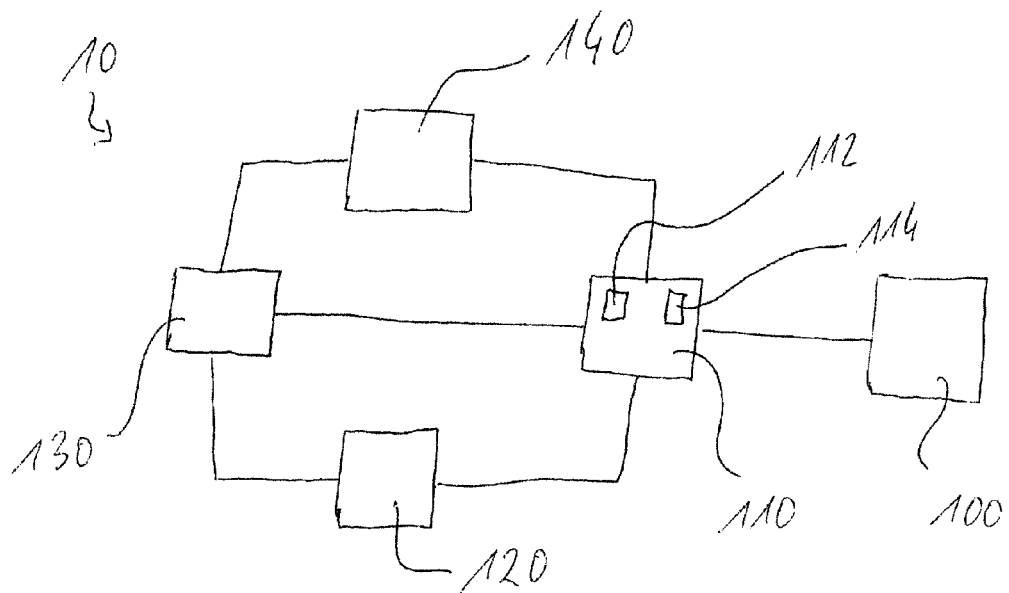
FIG. 1 is an animation arrangement according to an exemplary embodiment of the invention.

FIG. 1 illustrates an animation arrangement 10 which comprises a display device 100, a calculating device 110, a control device 120, a storage device 130, and a converting device 140. The calculating device 110 comprises a central processing unit, CPU, 112 and a graphics processing unit, GPU, 114.

The storage device 130 stores at least two implementations of instruction sets configured to be presented as the same animation on the display device 100. The instruction sets are carried out by the CPU 112 and/or GPU 114 and the display device is controlled by these components in order to present the animation scene.

The control device 120 is configured to evaluate, monitor, or determine operation parameters or operations conditions of the calculating device 110 and its components 112, 114 and to determine which of the multitude of instruction sets should be used by the calculating device under the determined operation parameters or operation conditions. Therefore, the control device 120 is coupled to the calculating device 110 and to the storing device 130.

The converting device 140 is configured to generate or convert the second instruction set, for example a GLSL implementation of an animation scene, based on the first instruction set, for example a QML implementation of an animation scene. The converting device 140 is therefore coupled to the storage device 130 for reading the first instruction set and for writing the second instruction set.

Additionally, the converting device 140 is coupled to the calculating device 110 such that the generated second instruction set can optionally be provided directly to the calculating device 110.

Animations in QML are done by animating properties of objects. Properties of different types can be animated using either a simple form of animation or more complex animation types. Writing fancy animation in QML is easy and quick, but depending on the complexity of the item animated it will utilize more computational resources of the CPU. An alternative is using Shaders, and write the same animation using GLSL. This technique may be better for complex items, but it implies OpenGL background knowledge and at least some average experience with 2D-3D computer graphics. Depending on the language in which the animation is written, during run time it will have different impacts on the hardware resources that are used. Writing an animation in QML is straight forward, just adding an animation type on top of item required to be animated. Doing the same in GLSL is more difficult, but in the end better performance may be the major gain. Less CPU load and, depending on structure of the item animated, even better fps rate. As a drawback some addition GPU used and some graphic memory used.

The animation arrangement 10 shown in FIG. 1 overcomes the drawback that, until now, the decision of which implementation to use was made during development, by implementing animations in either QML or OpenGL using vertex and shader fragments written in GLSL.

Having both implementation available and making a runtime decision, which is better to be used, depending on the system load/resources available solves performance issues.

The calculating device 110 will load and start either QML animation or GLSL animation, depending on the operation condition, i.e. a recommendation received from the control unit 120, which will collect system information/snapshots of memory usage, CPU load, etc., and then based on the overall system performance the control device 120 or the calculating device 110, select the most appropriate animation type.

The converting device 140 enables writing animations in QML and allowing the converting unit 140 to convert from QML to GLSL.

Taken as an input QML animation, the converting device 140 will generate, on demand, the GLSL code that will have the same output from the user experience point of view, but will do the sophisticated work for the developer. As an additional benefit system performance of the animation arrangement 10 will increase. The converting device 140 parses a selected portion or chuck of QML code, identifies target, checks validity of the property which will be animated, identifies the potential solution which can apply, and then depending on the user decision replace chuck on QML with a shader generated dynamically.

Figure 2:
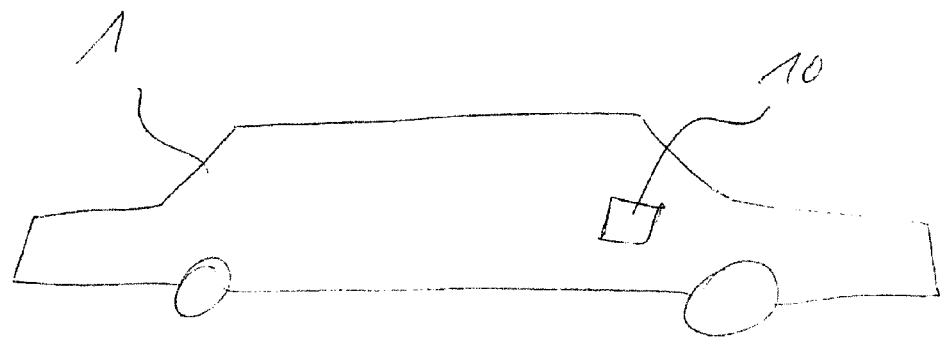
FIG. 2 is a vehicle with an animation arrangement according to an exemplary embodiment of the invention.

FIG. 2 shows a vehicle 1, in particular a passenger car, with an animation arrangement 10 as described above and hereinafter. The animation arrangement 10 is adapted to provide information, particularly visually displayed information, to an operator or driver.

Figure 3:
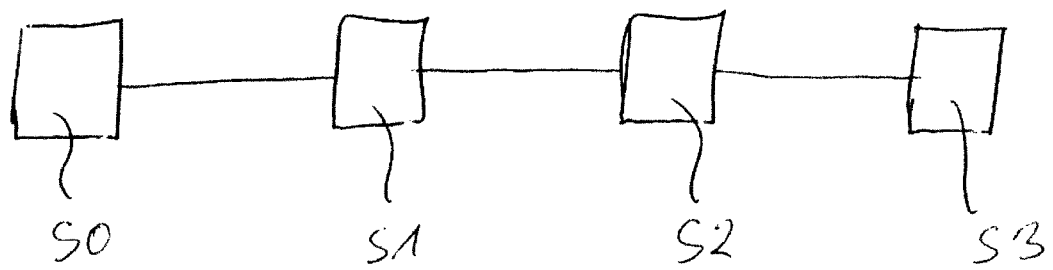
FIG. 3 is a flowchart for a method according to an exemplary embodiment of the invention.

FIG. 3 schematically shows a flow chart of a method for operating an animation arrangement 10. In a step S0, the first instruction set is converted into the second instruction set. In a subsequent step S1, a first instruction set and a second instruction set for displaying a same animation on the display device 100 are provided. In a subsequent step S2, one of the first and second instruction sets to be carried out by a calculating device 110 is selected based on a load parameter of the calculating device 110. In the last step S3, the animation is presented by a display device 100 based on the selected instruction set.

Figure 4:
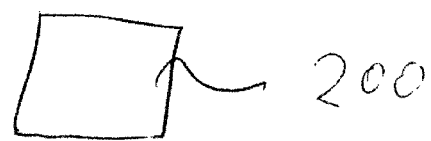
FIG. 4 is a computer program product according to an exemplary embodiment of the invention.

FIG. 4 schematically illustrates a computer program product 200 which is configured to carry out the steps of the method shown in FIG. 3 when being carried out on an animation arrangement 10 as shown in FIG. 1.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An animation arrangement for a vehicle, comprising:
a display device configured to display an animation;
a storage device configured to store a first instruction set and a second instruction set for displaying the animation on the display device; and
a calculating device configured to select one of the first instruction set and the second instruction set based on at least one load parameter of the calculating device, wherein the first instruction set is a Qt modelling language (QML) instruction set configured to perform the animation on the display device when carried out by the calculating device, and wherein the second instruction set is an open graphics library shading language (GLSL) instruction set configured to perform the animation on the display device when carried out by the calculating device, wherein the calculating device is configured to select one of the first instruction set and the second instruction set based on at least one of the group of load parameters consisting of: memory usage of each of the first instruction set and the second instruction set, and required calculation time of the calculating device for handling each of the first instruction set and the second instruction set.

2. The animation arrangement according to claim 1, wherein the calculating device selects one of the first instruction set and the second instruction set during a runtime of the animation arrangement.

3. The animation arrangement according to claim 2, wherein the calculating device is configured to select one of the first instruction set and the second instruction set based on at least one of the group of load parameters consisting of:
   memory usage of each of the first instruction set and the second instruction set,
   required calculation time of the calculating device for handling each of the first instruction set and the second instruction set, and
   an overall load of the calculating device.

4. The animation arrangement according to claim 1, further comprising a control device configured to:
   monitor the at least one load parameter of the calculating device and
   determine which of the first instruction set and the second instruction set that are available to use by the calculating device.

5. The animation arrangement according to claim 1, wherein the calculating device comprises a central processing unit (CPU) and a graphics processing unit (GPU),
   wherein the calculating device is configured to carry out at least some instructions of the second instruction set by the graphics processing unit.

6. The animation arrangement according to claim 1, further comprising a converting device configured to convert the first instruction set into the second instruction set.

7. The animation arrangement according to claim 6, wherein the converting device is configured to convert the first instruction set into the second instruction set before the calculating device requests one of the first instruction set and the second instruction set.

8. A method for operating an animation arrangement, comprising:
   providing a first instruction set and a second instruction set for displaying a same animation on a display device;
   selecting one of the first instruction set and the second instruction set to be carried out by a calculating device based on a load parameter of the calculating device; and
   presenting the animation by a display device based on the selected one of the first instruction set and the second instruction set,
   wherein the first instruction set is a Qt modelling language (QML) instruction set configured to perform the animation on the display device when carried out by the calculating device, and
   wherein the second instruction set is an open graphics library shading language (GLSL) instruction set configured to perform the animation on the display device when carried out by the calculating device, wherein the calculating device is configured to select one of the first instruction set and the second instruction set based on at least one of the group of load parameters consisting of: memory usage of each of the first instruction set and the second instruction set, and required calculation time of the calculating device for handling each of the first instruction set and the second instruction set.

9. The method according to claim 8, further comprising: converting the first instruction set into the second instruction set.

10. The method according to claim 9, wherein the converting of the first instruction set into the second instruction set is carried out prior to providing the first instruction set and the second instruction set.

11. A computer program product stored on a non-transitory media configured to cause an animation arrangement having a display device configured to display an animation, a storage device configured to store a first instruction set and a second instruction set for displaying the animation on the display device, and, a calculating device configured to select one of the first instruction set and the second instruction set based on at least one load parameter of the calculating device to
   providing the first instruction set and the second instruction set for displaying the same animation on a display device;
   selecting one of the first instruction set and the second instruction set to be carried out by the calculating device based on the at least one load parameter of the calculating device; and
   presenting the animation by the display device based on the selected one of the first instruction set and the second instruction set,
   wherein the first instruction set is a Qt modelling language (QML) instruction set configured to perform the animation on the display device when carried out by the calculating device, and
   wherein the second instruction set is an open graphics library shading language (GLSL) instruction set configured to perform the animation on the display device when carried out by the calculating device, wherein the calculating device is configured to select one of the first instruction set and the second instruction set based on at least one of the group of load parameters consisting of: memory usage of each of the first instruction set and the second instruction set, and required calculation time of the calculating device for handling each of the first instruction set and the second instruction set.

* * * * *